Figure 3:
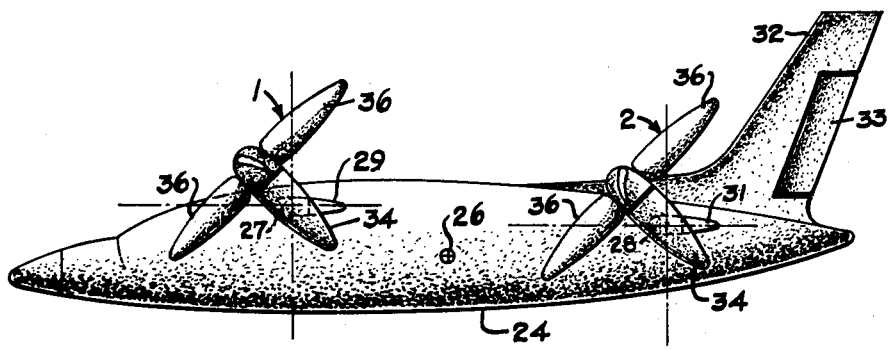

May 4, 1965   N. C. OLSON   3,181,810
ATTITUDE CONTROL SYSTEM FOR VTOL AIRCRAFT
Filed Feb. 27, 1961   14 Sheets-Sheet 1
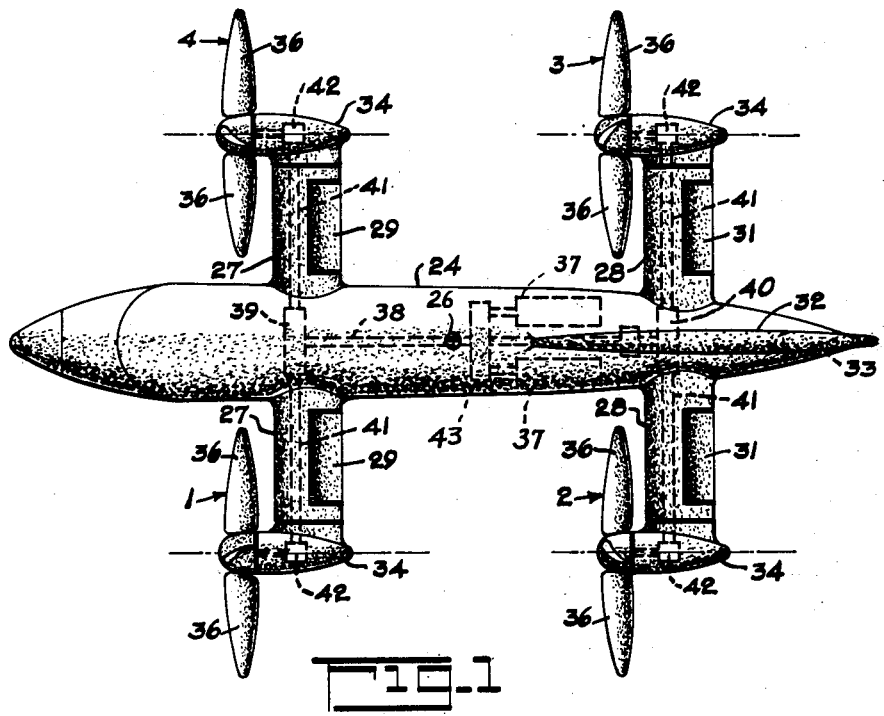
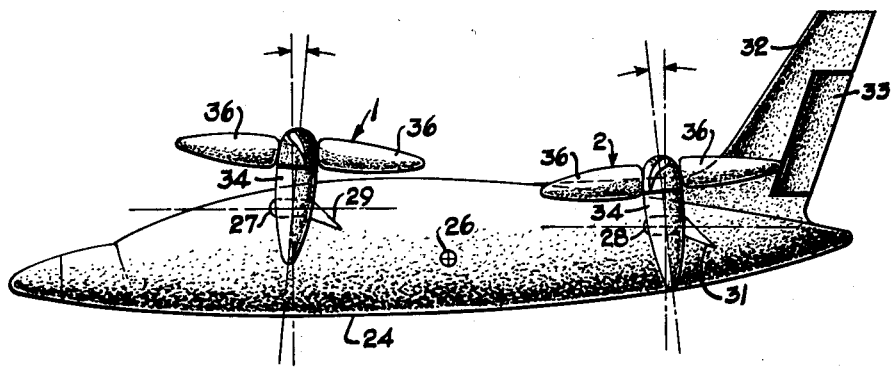
INVENTOR.
NORMAN C. OLSON
BY
*William V. Ebs*
HIS ATTORNEY

INVENTOR.
NORMAN C. OLSON
BY

HIS ATTORNEY

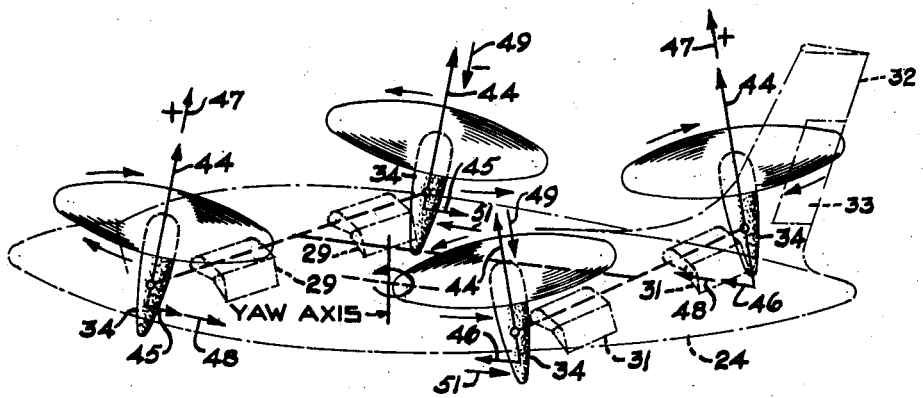
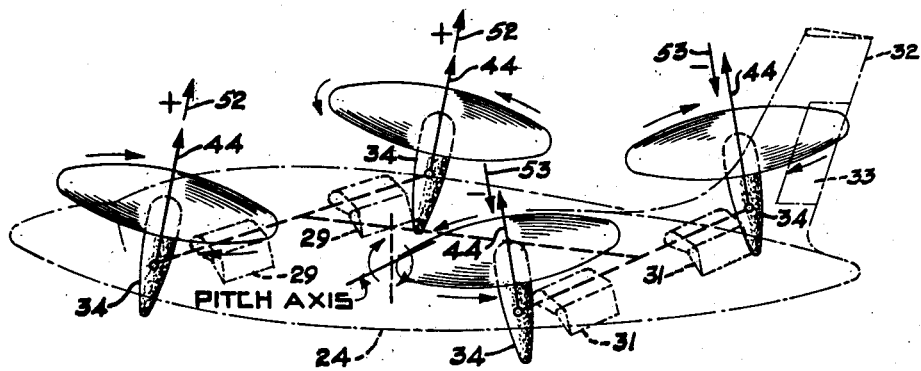
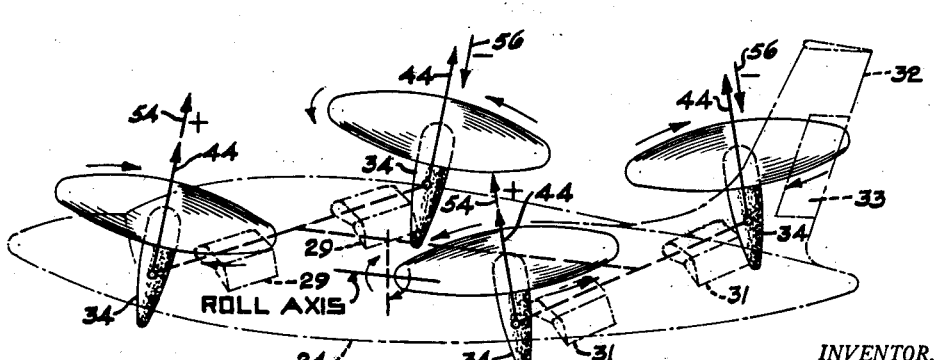

May 4, 1965  N. C. OLSON  3,181,810
ATTITUDE CONTROL SYSTEM FOR VTOL AIRCRAFT
Filed Feb. 27, 1961  14 Sheets-Sheet 4

INVENTOR.
NORMAN C. OLSON
BY
William V. Ebs
HIS ATTORNEY

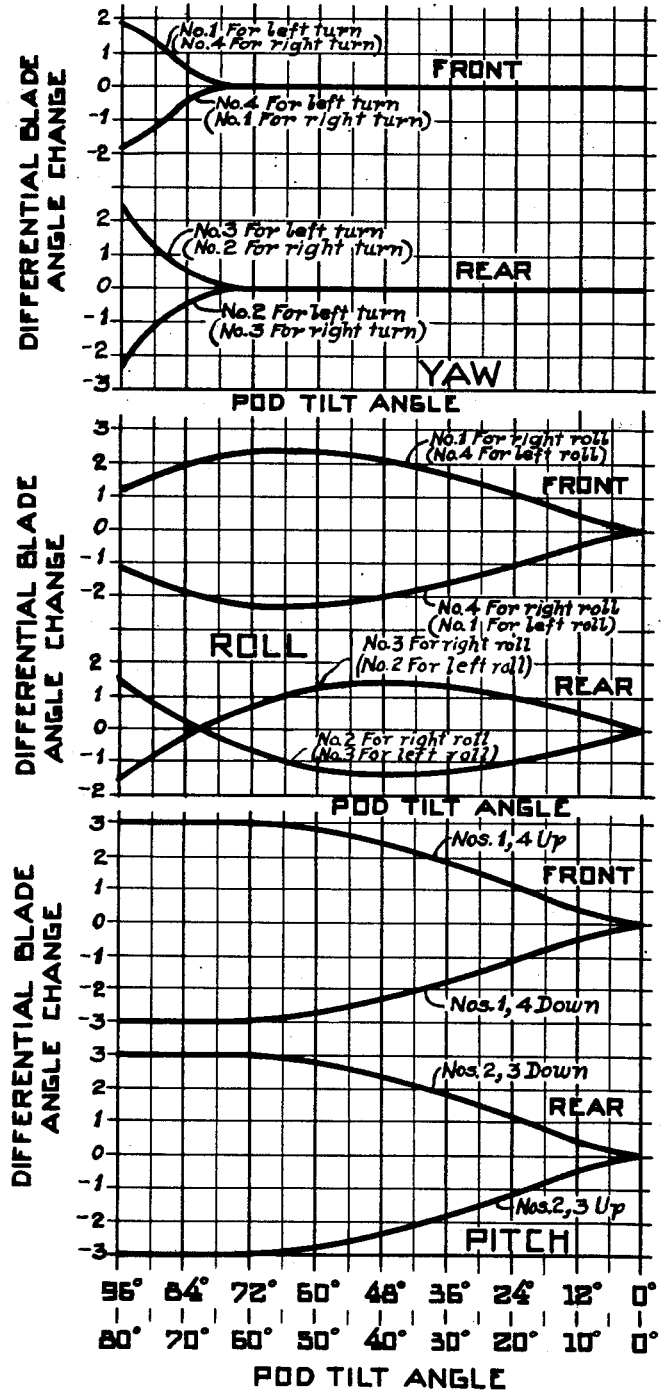

May 4, 1965

N. C. OLSON 3,181,810

ATTITUDE CONTROL SYSTEM FOR VTOL AIRCRAFT

Filed Feb. 27, 1961

14 Sheets-Sheet 6

INVENTOR.
NORMAN C. OLSON
BY
William V. Ebs
HIS ATTORNEY

May 4, 1965 N. C. OLSON 3,181,810
ATTITUDE CONTROL SYSTEM FOR VTOL AIRCRAFT
Filed Feb. 27, 1961 14 Sheets-Sheet 7

Fig. 13 A

INVENTOR.
NORMAN C. OLSON
BY
William V. Ebs
HIS ATTORNEY

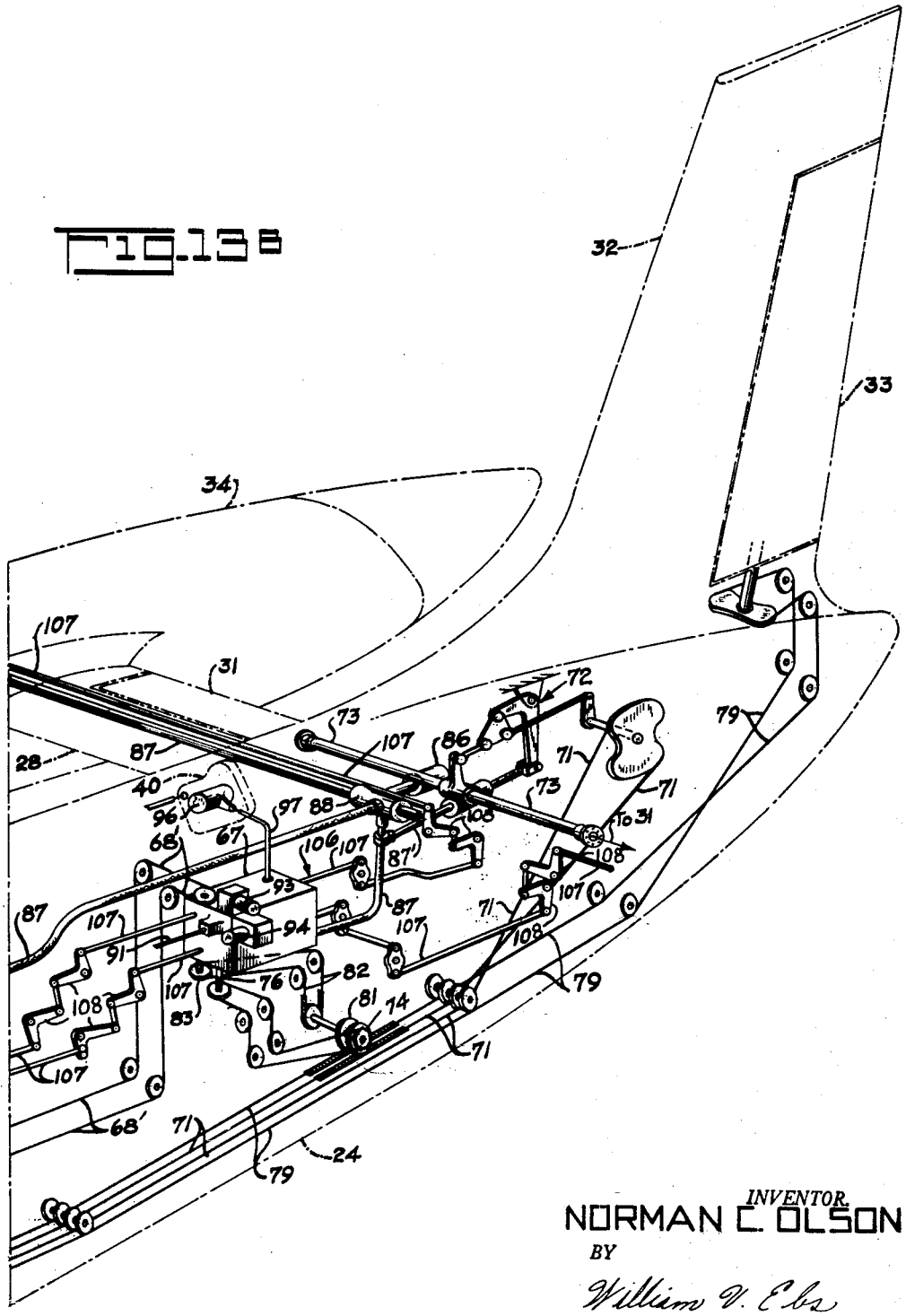

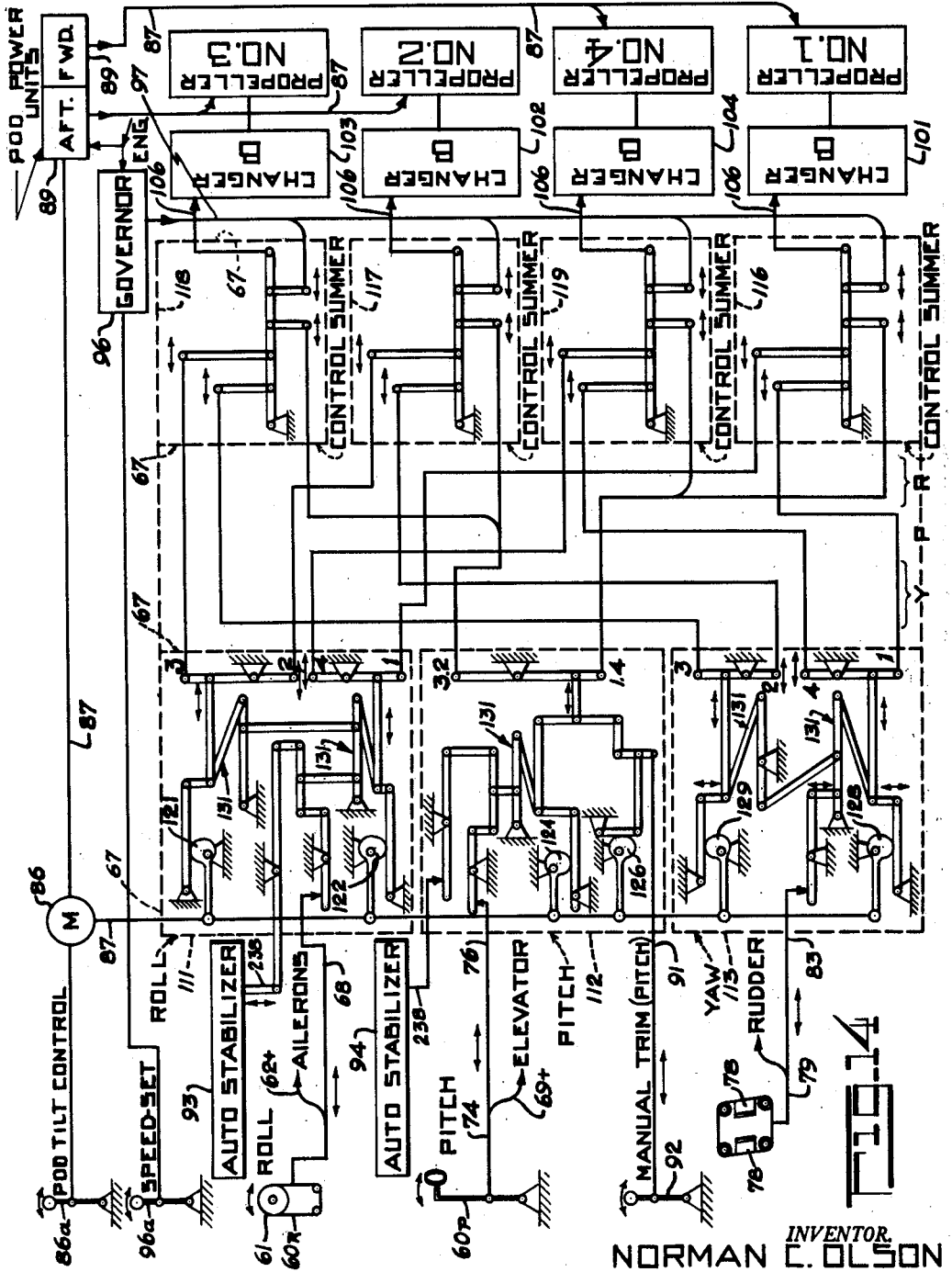

May 4, 1965   N. C. OLSON   3,181,810
ATTITUDE CONTROL SYSTEM FOR VTOL AIRCRAFT
Filed Feb. 27, 1961   14 Sheets-Sheet 10
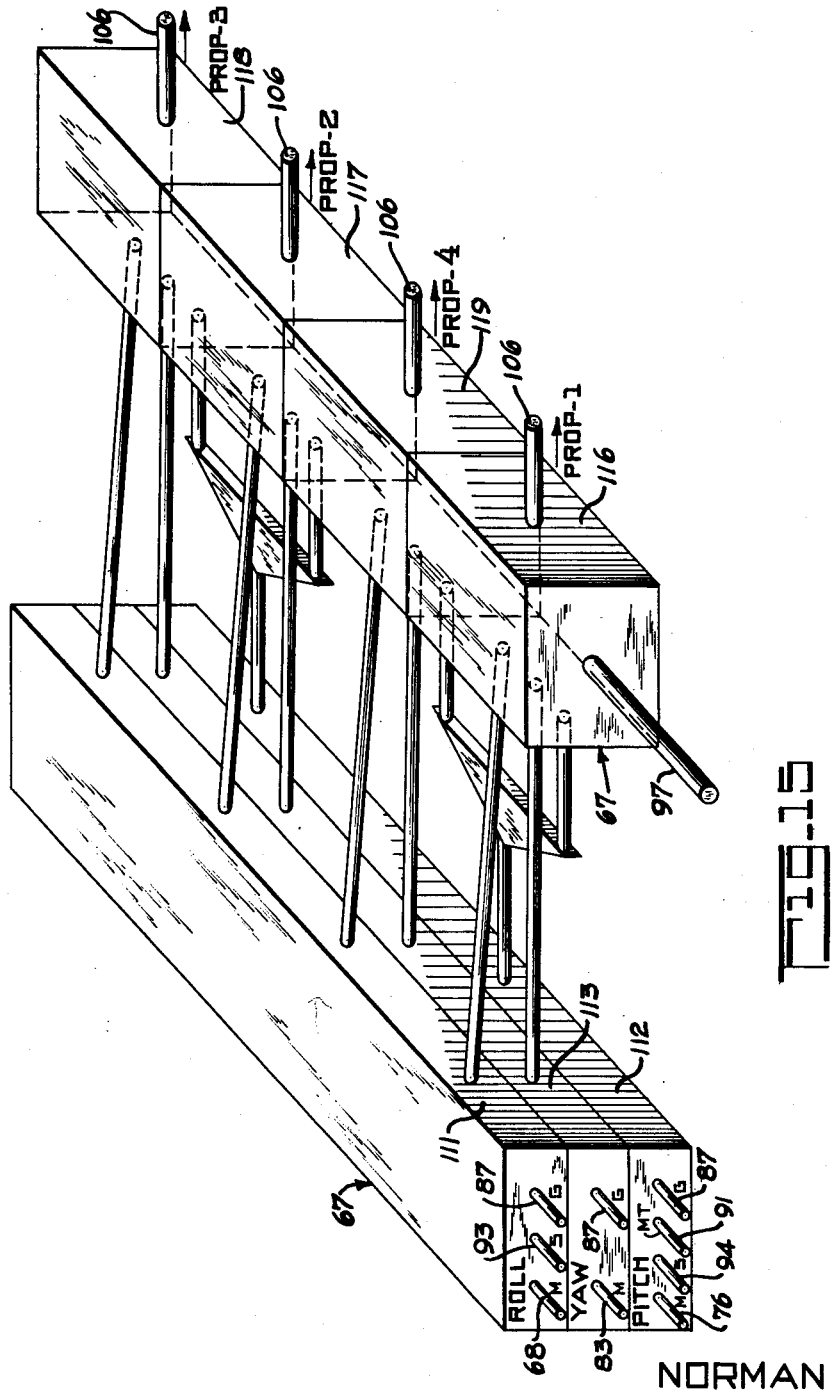
INVENTOR.
NORMAN C. OLSON
BY
William V. Eba
HIS ATTORNEY

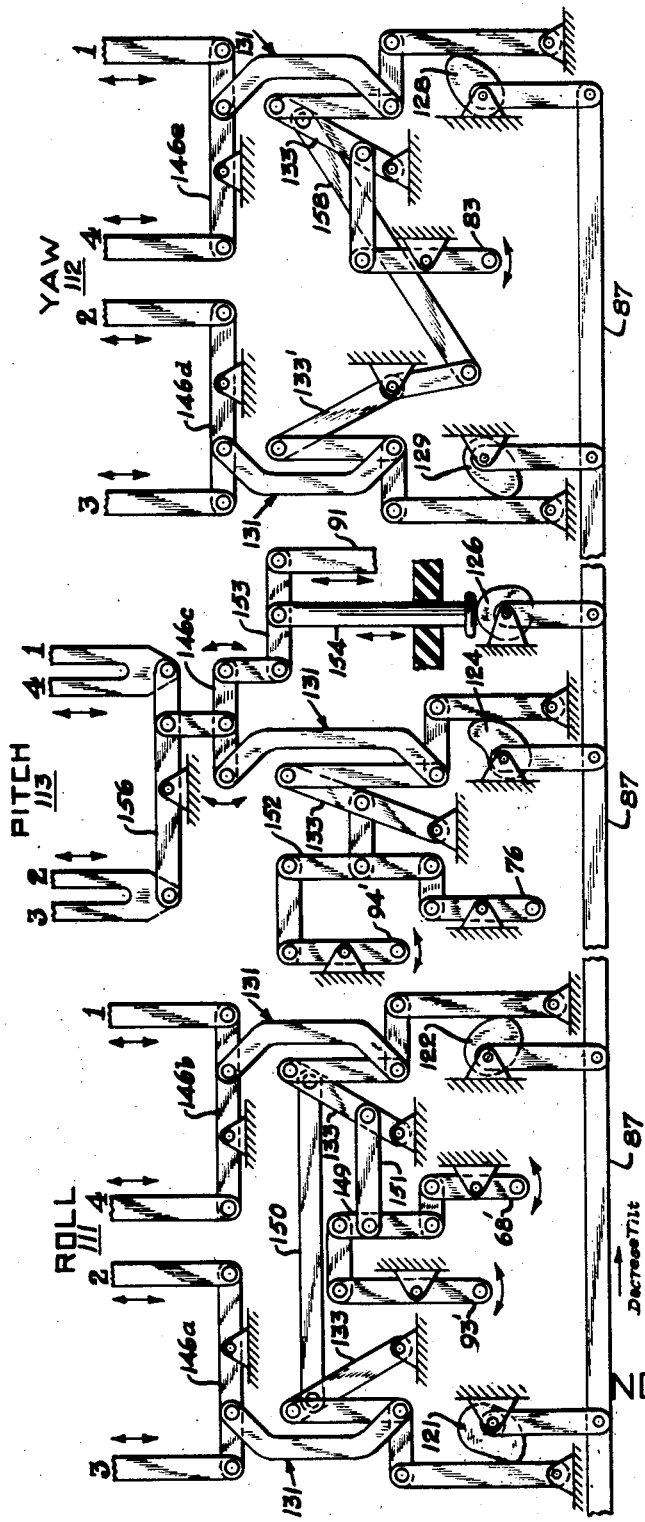

May 4, 1965    N. C. OLSON    3,181,810
ATTITUDE CONTROL SYSTEM FOR VTOL AIRCRAFT
Filed Feb. 27, 1961    14 Sheets-Sheet 14

INVENTOR.
NORMAN C. OLSON
BY
William V. Ebs
HIS ATTORNEY

3,181,810
ATTITUDE CONTROL SYSTEM FOR VTOL AIRCRAFT
Norman C. Olson, Denville, N.J., assignor to Curtiss-Wright Corporation, a corporation of Delaware
Filed Feb. 27, 1961, Ser. No. 91,683
15 Claims. (Cl. 244—7)

My invention relates to systems for controlling the flight attitude of "VTOL aircraft," that is, aircraft which can take off and land vertically, and accomplish a transition between vertical and horizontal modes of flight.

The invention is directed to an attitude control system for "VTOL aircraft" of a kind having a plurality of thrust producing devices such as propellers, rotors, ducted fans or jet engines which selectively sustain or propel the aircraft in flight, and which are so situated that moments about one or more of the control axes of pitch, roll and yaw may be created by selectively adjusting thrust of the thrust producing units. The system of the invention provides for the regulation of such moments in a novel manner through unique subsystems and mechanisms whereby flight attitude of such aircraft may be conveniently controlled.

In the case of a propeller driven "VTOL aircraft" of the kind mentioned, moments about the pitch, roll and yaw axes of the vehicle are produced most conveniently by differentially modifying blade angle settings of the several propellers. With rotors or ducted fans as the thrust producing units, flight attitude is most easily controlled in a similar manner, i.e., by differentially modifying blade angle settings of the rotor or fans. With jet engines as the thrust producing units, attitude control may be effected by differentially modifying fuel settings for the engines.

The drawings show, and the specification describes, the control system of the invention as specifically adapted to a propeller driven "VTOL aircraft" of the kind mentioned. Such aircraft includes a pair of propellers located forward of the center of gravity of the vehicle and another pair of propellers located aft of the center of gravity. One propeller of each pair is located outboard of the fuselage on one side of the roll axis of the aircraft and the other propellers are located outboard of the fuselage on the other side of the roll axis. All propellers are tiltable between nearly vertical and nearly horizontal positions. The aircraft ascends and descends vertically, and hovers with the propellers in their nearly vertical positions, whereas sustained horizontal flight is achieved with the propeller axes in their nearly horizontal positions. The propeller axes are gradually tilted between these extreme positions to accomplish a transition between the horizontal and other modes of flight. The axes of rotation of forward propellers are not quite parallel to the axes of rotation of the rear propellers in hover and during transition.

Novel systems and mechanisms of the invention provide for attitude control of this propeller driven "VTOL aircraft" of the drawings and specification in hover and during transition. Such systems and mechanisms have to do primarily with the regulation of thrust of the several propellers, both in unison and individually to provide full three-axis control, i.e., in pitch, roll and yaw. The control system of the invention is so contrived that the operation of the pilot's controls to produce a moment about one control axis will not produce a moment about either of the other control axes. The magnitude of the moment about a control axis produced by differential thrust in response to a given movement of a pilot's control depends upon the angle of tilt of the propellers.

Objects of the invention are to:

Provide a control system whereby the attitude of "VTOL aircraft" about pitch, roll and yaw axes may be controlled by changing thrusts of a plurality of propellers or other thrust producing devices constituting primary means for lifting such aircraft from the ground.

Provide a control system whereby the attitude of "VTOL aircraft" may be controlled about pitch, roll and yaw axes, either about any one axis singly or about several of said axes concurrently with thrust changes coordinated among several propellers or other thrust producing devices.

Provide a control system whereby the attitude of "VTOL aircraft" in hover about pitch, roll and yaw axes may be controlled with differential thrust between pairs of propellers or other thrust producing devices.

Provide a combination control system for "VTOL aircraft" utilizing thrust changes for any one or all of pitch, roll and yaw control with the aircraft in hover and utilizing air-foils for any one or all of pitch, roll or yaw control when the aircraft is in horizontal high speed flight.

Provide a control system for "VTOL aircraft" that offers pitch, roll and yaw control during transition by means of a combination of thrust control and aerodynamic surface control.

Provide a control system whereby the attitude of "VTOL aircraft" in hover about the pitch axis may be controlled with differential thrust between fore and aft pairs of propellers or other thrust producing devices.

Provide a control system whereby the attitude of "VTOL aircraft" in hover about the roll axis may be controlled with differential thrust between starboard and port pairs of propellers or other thrust producing devices.

Provide a control system whereby the attitude of "VTOL aircraft" in hover about the yaw axis may be controlled with differential thrust between diagonal pairs of propellers or other thrust producing devices.

Provide a control system for "VTOL aircraft" that produces a rolling moment in hover in response to a pilot's roll command by means of thrust control without simultaneously creating a pitching or yawing moment.

Provide a control system for "VTOL aircraft" that produces a yawing moment in hover in response to a pilot's yaw command by means of thrust control without simultaneously creating a pitching or rolling moment.

Provide a control system for "VTOL aircraft" that gradually reduces the effectiveness of thrust control as a means of regulating flight attitude as aircraft forward speed is increased.

Provide a control system for "VTOL aircraft" that gradually increase the effectiveness of thrust control as a means of regulating flight attitude as aircraft forward speed is decreased.

Provide a control system for "VTOL aircraft" that augments with thrust control gradually decreasing effectiveness of aerodynamic control surfaces as aircraft forward speed is decreased.

Provide a control system for "VTOL aircraft" that produces a pitching moment in transition in response to a pilot's pitch command by means of a combination of thrust and aerodynamic surface control without simultaneously creating a substantial rolling or yawing moment.

Provide a control system for "VTOL aircraft" that produces a rolling moment in transition in response to a pilot's roll command by means of a combination of thrust and aerodynamic surface control without creating a pitching or yawing moment.

Provide a control system for "VTOL aircraft" that produces a yawing moment in transition in response to a pilot's yaw command by means of a combination of thrust and aerodynamic surface control without creating a pitching or yawing moment.

Provide a control system for "VTOL aircraft" that modulates differential thrust between fore and aft tiltable propellers to compensate for aerodynamic pitching moments occasioned by tilting the propellers.

Provide a control system for "VTOL aircraft" that modulates thrusts of tiltable propellers in accordance with angle of tilt to compensate for aerodynamic pitching moments occasioned by tilting the propellers and in accordance with aircraft attitude change resulting either from external aerodynamic phenomena or from internal load trim in the aircraft.

Provide a control system for "VTOL aircraft" that utilizes a tilted arrangement of propellers or other thrust producing devices to achieve yaw control in hover and thereby eliminates the necessity of resorting to yaw fans, tail rotors, or jet thrust devices for this purpose.

Provide a control system for "VTOL aircraft" that utilizes propeller torque reaction on the airframe to augment yaw control.

Provide a control system for "VTOL aircraft" that accomplishes pitch, roll and yaw control of the aircraft with changes in the thrusts of several propellers, and that provides for governor control of collective blade angle of the propellers in response to changes in propeller speed so as to hold said speed constant at a value established by the pilot.

Provide a control system for "VTOL aircraft" that accomplishes pitch, roll and yaw control of the aircraft with changes in the blade angles of a plurality of propellers, and that permits control in pitch, roll and yaw in the event one propeller fails to respond to blade angle signals.

Provide an attitude control system for "VTOL aircraft" that disposes aerodynamic surfaces during hover in positions to reduce interference with the slipstreams of thrust producing devices.

Provide a novel attitude control system for aircraft that includes pitch and roll stabilizers of mechanical or hydromechanical design which augment the natural damping of the aircraft to render the aircraft stable in pitch and roll.

Provide an attitude control system for "VTOL aircraft" utilizing all mechanical mechanisms for transmitting, modulating and summing pilot command signals.

Provide an attitude control system for aircraft utilizing all mechanical mechanisms of the bellcrank and connecting rod variety for combining pitch, roll, yaw and collective blade angle signals into a total command signal for individual propellers.

Provide novel mechanism for changing control effectiveness between one or more control inputs and one or more control outputs.

Provide novel mechanism for combining a plurality of control inputs into a single output through the use of rugged mechanical devices having primary reliability characteristics.

Other objects and advantages of the invention will become apparent hereinafter.

For a better appreciation of the invention and for a fuller understanding of the features and objects associated therewith, reference should be made to the accompanying drawings which show a preferred embodiment of the invention. It should be appreciated however that the particular arrangements of the drawings are not to be construed as limiting the scope of the invention, inasmuch as the particular configuration of the aircraft shown in the drawings, as well as the configuration and mechanisms of the control system are subject to design modification.

Figure 4:
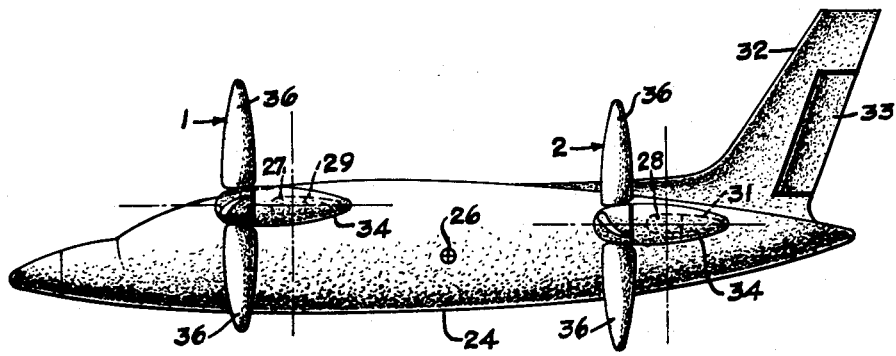
Figure 8:
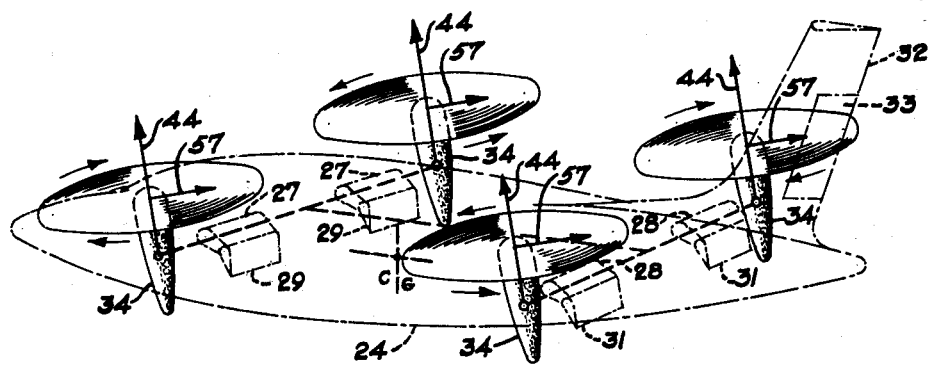
Figure 9:
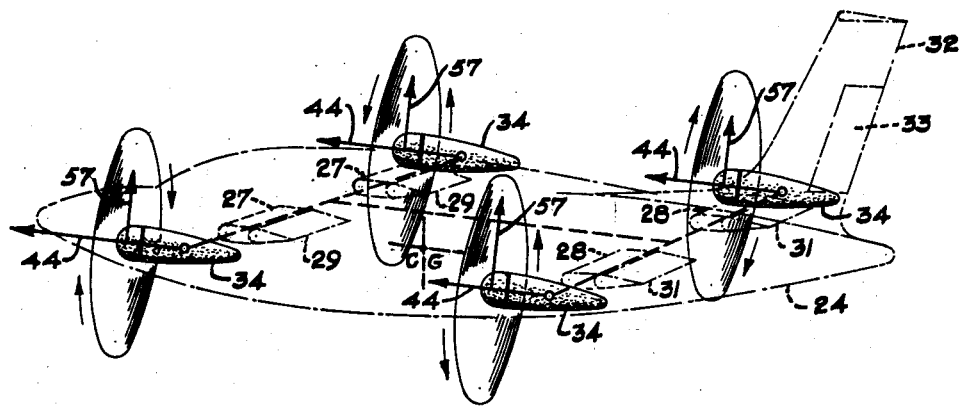
Figure 13:
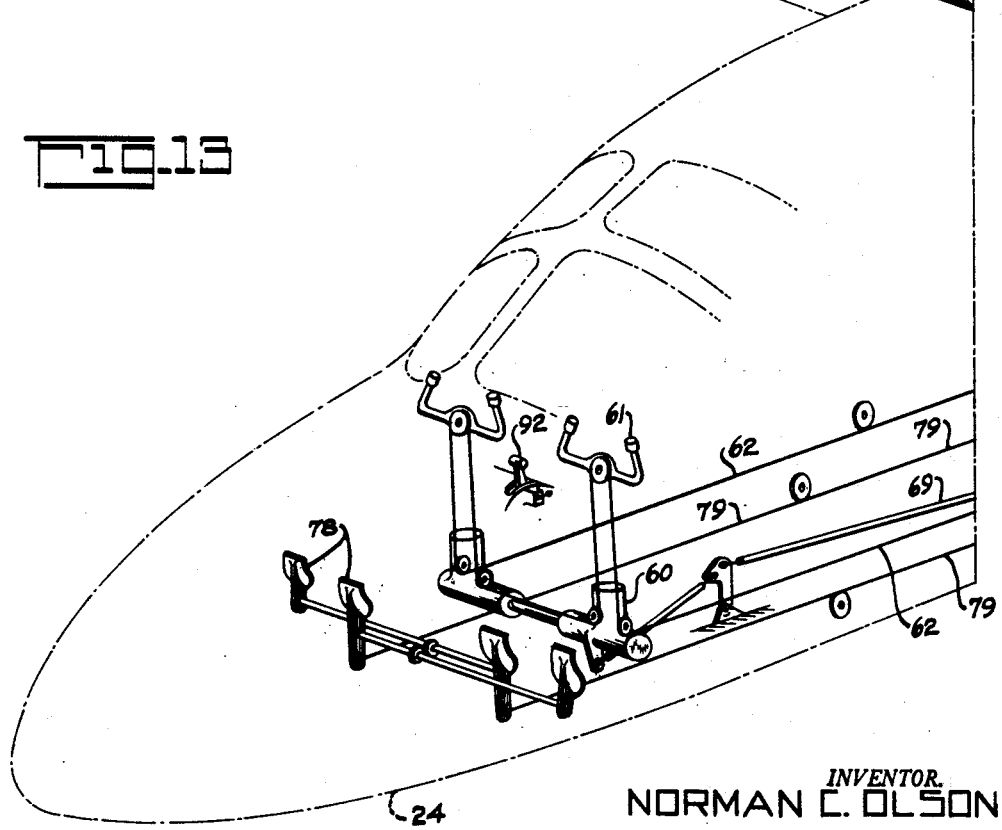
Figure 19:
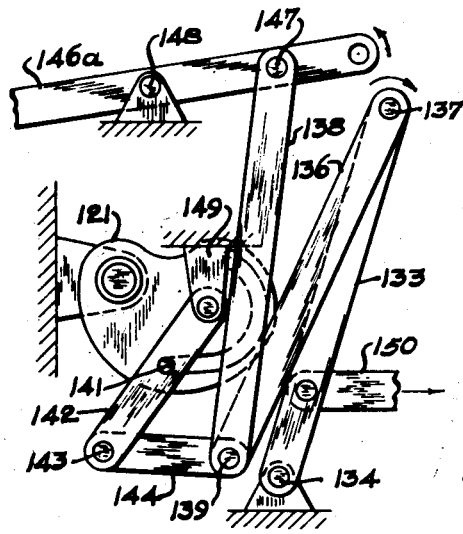
Figure 20:
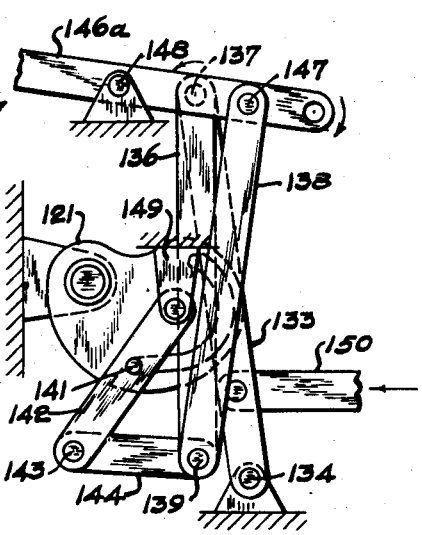
Figure 21:
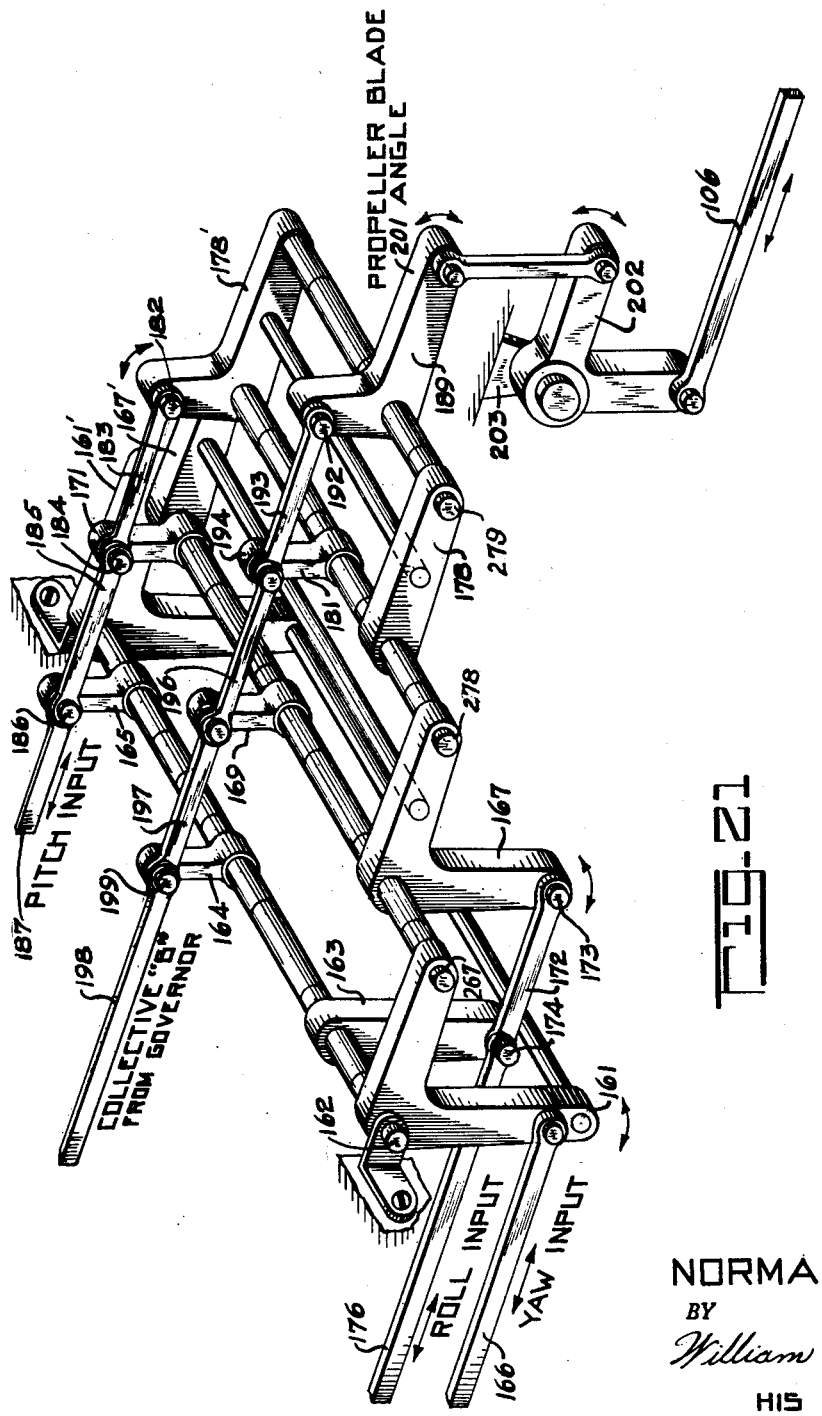
Figure 22:
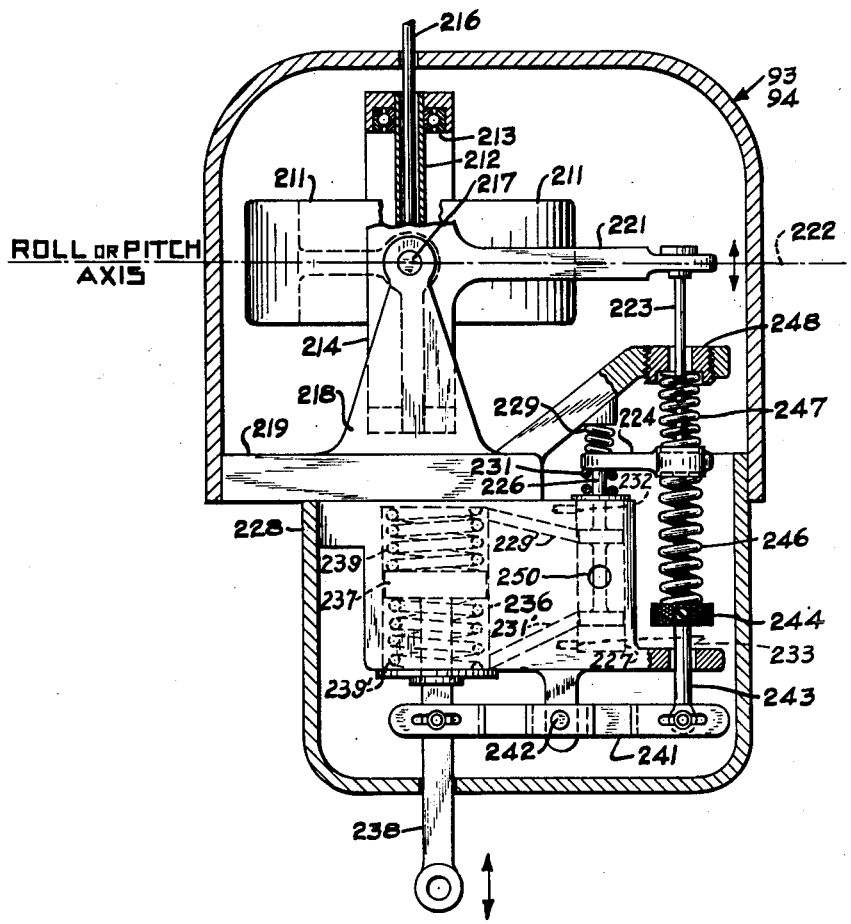

In the drawings wherein similar reference characters designate similar or substantially identical components:

FIG. 1 is a plan view of a "VTOL aircraft" controllable according to the invention, FIG. 2 is a side elevation of the aircraft shown in a configuration for vertical take-off, landing or hovering flight, FIG. 3 is a side elevation of the aircraft shown in a configuration for transition between vertical and horizontal modes of flight or between hovering and horizontal flight, FIG. 4 is a side elevation of the aircraft in the configuration for cruising flight, FIG. 5 is a perspective schematic view of the aircraft showing the vehicle in the configuration for hovering flight, and including vectorial representations of lifting and yaw control forces, FIG. 6 is a perspective schematic view of the aircraft in the configuration for hovering flight showing forces for lifting and aircraft pitching control, FIG. 7 is a perspective schematic view of the aircraft in the configuration for hovering flight showing forces for lifting and roll control, FIG. 8 is a perspective schematic view showing the aircraft in a configuration for transition, FIG. 9 is a perspective schematic view of the aircraft during horizontal flight, FIGS. 10, 11 and 12 are charts showing characteristic curves of propeller blade angle limits for yaw, roll and pitch control respectively between hovering and forward flight configurations, FIGS. 13, 13a and 13b are perspective diagrammatic views of the aircraft showing the significant control instrumentalities as they are disposed in a preferred arrangement, FIG. 14 is a diagram illustrating the functional relationship of the control instrumentalities of the invention, FIG. 15 is a pictorial representation showing the relationship between control gain changing assemblies and control summing assemblies, FIG. 16 is a schematic view of gain changing devices for pitch, roll and yaw control, FIGS. 17, 18, 19 and 20 are diagrammatic views of a typical gain changer in different positions of adjustment, FIG. 21 is a perspective schematic view showing one of the summing devices, FIG. 22 is a diagrammatic view showing one of the automatic stabilizing devices used in the control system.

Referring first to FIGS. 1–4, showing a "VTOL aircraft" controllable according to the invention, reference character 24 designates the fuselage of such vehicle and reference character 26 denotes the aircraft's center of gravity. The aircraft includes airfoil surfaces 27 extending laterally and disposed forwardly of the center of gravity, and airfoil surfaces 28 extending laterally and disposed rearwardly of the aircraft center of gravity. The forward airfoils 27 include rearward hinged flaps 29 which operate as ailerons in horizontal flight, and the rear airfoils 28 include rearward hinged flaps 31 which operate as elevators in horizontal flight. The fuselage is further equipped with a fin 32 and a rudder 33 which perform in conventional fashion in horizontal flight. At the outer end of each of the airfoils 27 and 28, a nacelle or pod is disposed, each pod 34 having mounted thereon a variable pitch propeller 36. Means to be described later, are provided so that all pods 34, with their propellers, may be tilted together between nearly vertical positions shown in FIG. 2 and substantially horizontal positions shown in FIGS. 1 and 4. Reference characters 1, 2, 3 and 4 are applied to the four propellers shown, these numbers serving to identify the propellers relative to their position on the aircraft as follows: 1 designates the left front propeller, 2 is the left rear propeller, 3 is the right rear propeller and 4 is the right front propeller. The propeller arrangement is symmetrical with respect to a vertical plane through the roll axis of the aircraft. The forward propellers 1 and 4 are arranged forward of the center of gravity of the aircraft, with the rear propellers arranged rearward of the center of gravity. In the aircraft shown, as an example, the front propellers in the hover and vertical flight position (FIG. 2) are closer to the center of gravity than are the rear propellers, but this particular arrangement forms no part of the invention and is not essential thereto.

All four propellers connect through shafting and gearing with drive means carried by the aircraft, such as the two engines shown, each of which is designated by reference character 37. The engines drive a shaft 38 through reduction gearing 43. The shaft 38 drivably connects through corresponding gear boxes 39 and 40 at the forward and rear ends of the aircraft respectively with forward and rear shafts 41. As shown, drive shafts 41 extend from the ends of each of the boxes 39 and 40 to the pods 34 wherein a right angle drive 42 is located which drivably connects the shafts 41 to the respective propellers 36. The power train assures that the shafts 41 and all four propellers rotate in unison at the same speed.

In accordance with the invention, the pods are positioned to dispose the propeller axes in nearly, but not quite, vertical positions for hovering, and for take-off and landing (see FIG. 2). The propeller axes are slightly displaced from the vertical in order to provide for yaw control which is accomplished in a manner hereinafter explained. As shown, the propeller axes instead of being truly vertical in hover, relative to the aircraft longitudinal axis, are upwardly convergent, the axes of forward propellers 1 and 4 lying several degrees rearward of the vertical and the axes of the rear propellers 2 and 3 lying several degrees forward of the vertical.

In FIG. 3, the pods are shown tilted forwardly at approximately forty-five degrees. The angles of the forward and rear propeller axes, with respect to the vertical, are however, slightly different, the difference being proportional to the convergence shown in FIG. 2. In FIG. 4 the pods have been tilted to the horizontal position for full speed forward flight and in this configuration both forward and rear propeller axes make a substantially zero or slightly positive or "up" angle with the longitudinal axis of the aircraft.

When the aircraft is in the configuration of FIG. 2, the ailerons 29 and the elevators 31 are drooped, that is lowered, as shown. Control effectiveness of these surfaces is negligible in hovering flight and drooping them prevents the surfaces from unduly interfering with the downward slipstream of the several propellers. In response to decrease in the tilt angle of the propellers, the ailerons 29 and the elevators 31 are raised to enable their use in forward flight (see FIGS. 3 and 4).

FIGS. 5–7 depict the propeller thrust forces, designated by reference character 44, and the manner in which such forces are used to control the aircraft in hover. Each of the four propellers 1–4, which are substantially identical in size and shape, creates an axial force or thrust. As has been pointed out the pods are nearly, but not quite, vertical in hover, and forward propeller axes are inclined rearwardly whereas the rearward propeller axes are inclined forwardly. The forward propellers 1 and 4 are axially parallel, and likewise the rear propellers 2 and 3 are axially parallel. As a result of this arrangement, the forward propellers 1 and 4 create, in steady hover, equal horizontal thrust components 45, directed rearwardly, while the two rearward propellers 2 and 3 produce equal horizontal thrust components 46 directed forwardly. The forces 45 produce equal and opposite moments about the yaw axis of the aircraft as do the forces 46, and therefore, no net turning or yawing moment results on the aircraft. FIG. 5 displays how yaw control is realized. A turning effect to the left is produced by increasing the blade angles of diagonally opposite propellers 1 and 3 to thereby create the positive thrust increments 47 which have horizontal force increments 48. The two force increments 48 add to horizontal force components 45 and 46 to produce a leftward turning couple on the aircraft. While the blade angles of propellers 1 and 3 are increased, the blade angles of propellers 4 and 2 are simultaneously decreased to reduce their thrusts by thrust decrements 49. These decrements consequently reduce the horizontal force components of propellers 4 and 2 by horizontal force decrements 51. These horizontal force decrements 51 constitute an additional turning couple to yaw the aircraft to the left. Should yaw to the right be desired the blade angles of propellers 4 and 2 are increased, and the blade angles of propellers 1 and 3 are decreased, the changes in thrust from the several propellers producing yaw couples for rightward turning. The magnitude of a resultant yawing moment produced in the described manner is dependent upon the particular blade angle changes effected, and is under the control of the pilot.

Yaw control is further assisted by differential changes in the torque required for turning the propellers to produce either more or less thrust, the directions of rotation of the several propellers being so chosen that the differential torque between propellers assists the yawing moments derived from the horizontal components of thrust. It will be noted that propellers 1 and 3 rotate clockwise as seen from above while propellers 2 and 4 rotate counterclockwise as viewed from above. These directions of rotation are readily established by judicious selection of the drive gearing for them.

The blade angles of propellers 1 and 4 are changed equally in an opposite sense as are the blade angles of propellers 2 and 3. The resulting changes in thrust of propellers 1 and 4, as well as of propellers 2 and 3 differ slightly due to non-linearities in the relationship between blade angle and thrust; however, such differences in thrust are unimportant so far as total lift on the aircraft is concerned. The differences are very minor, they persist for a very short period of time, and the inertia of the aircraft is relatively large, so that variations in altitude are negligible.

Yaw control in hover may be accomplished with the propellers in an alternative configuration in which the axes of propellers 1 and 2 are upwardly divergent and the axes of propellers 3 and 4 are also upwardly divergent, propellers 1 and 4 and propellers 2 and 3 having parallel axes of rotation. The propellers in such configuration would be rotated in opposite directions from that shown in the drawings to take advantage of the torque changes occurring when the blade angles of the propellers are adjusted in the manner described for the purpose of yawing the vehicle. It is also possible to have the axes of rotation of all four propellers vertical in hover, and to yaw the vehicle with only the yawing moments due to the torque changes produced by increasing the blade angles of one pair of diagonally opposite propellers and decreasing blade angles of the other propellers. Larger blade angle changes would be required with the propeller axes vertical, however, to produce a yawing moment of given magnitude than with the propeller axes of rotation of the forward and rear propellers inclined. If the thrust producers are jets, yaw control may be provided by differentially controlling the magnitude of the jet thrusts. In this case the axes of the forward jets in hover would be inclined slightly forward of the vertical and the axes of the rear jets would be inclined slightly aft of the vertical. For a left turn, the thrusts of jets 2 and 4 would be increased and those of jets 1 and 3 decreased; whereas for a right turn the thrusts of jets 1 and 3 would be increased and those of jets 2 and 4 decreased.

Other means for providing suitable yaw control would include inclining the axis about which the axis of the thrust producer is tilted, so that the axes of thrust producers 1 and 4, in the hover condition, would converge, as would the axes of thrust producers 2 and 3. If the inclination is upward (as with positive wind dihedral) the axes of thrust producers 1 and 4 would converge upward, as would the axes of thrust producers 2 and 3. Then, if the thrusts of thrust producers 1 and 3 were increased and those of thrust producers 2 and 4 decreased, a yawing moment to the right is produced.

FIG. 6 shows the means by which pitching control of the aircraft is obtained in the hovering configuration. Here, the two forward propellers 1 and 4 are increased in blade angle while the two rear propellers 2 and 3 are decreased in blade angle respectively creating thrust increments 52 at the forward propellers and thrust decrements 53 at the rear propellers. This creates a pitch-up couple about the pitch axis of the aircraft resulting in a nose-up change of attitude. A pitch-down effect is produced by reducing the blade angles of the two forward propellers and by increasing the blade angles of the two rear propellers. The blade angles of the forward propellers are changed equally in the same sense. The blade angles of the rear propellers are also changed equally in the opposite sense from the forward propellers but in the same amount as the forward propellers. The magnitude of the resultant pitching moment on the aircraft depends upon the magnitude of the blade angle changes of the forward and rear propellers and is controllable by the pilot. The blade angle changes which control the vehicle about the pitch axis do not produce resultant moments about either the yaw axis or the roll axis. As noted above in reference to yaw control forces, the total lift exerted by the four propellers on the aircraft does not change significantly during pitch control in hover.

FIG. 7 shows the means by which roll control of the aircraft is obtained about the longitudinal roll axis. For roll to the right, the two leftward propellers 1 and 2 are increased in blade angle while the two rightward propellers 4 and 3 are decreased in blade angle, resulting in roll couples about the roll axis, tilting the aircraft to the right. In like fashion to roll the aircraft to the left the thrust on propellers 4 and 3 is increased by increasing their blade angles while the thrust from propellers 1 and 2 is decreased by decreasing their blade angles, causing a rolling couple to the left. Propeller thrust increments 54 and propeller thrust decrements 56, as shown, provide the roll couple to the right, which result respectively from increasing the blade angle of propellers 1 and 2 and decreasing the blade angle of propellers 4 and 3. The blade angles of forward propellers are changed equally in opposite sense, and the blade angles of rear propellers are changed equally in opposite sense for roll control. The magnitude of the resultant rolling moment, as determined by such blade angle changes, is controllable by the pilot. The total lift of the propellers on the aircraft is unaffected by the blade angle changes for roll control in hover.

For longitudinal balance in hover, it is obvious that the moment of the thrusts of the front propellers about the center of gravity of the aircraft in the hover condition must be equal and opposite to the moment of the thrusts of the rear propellers. If the center of gravity is midway between the propellers, the thrusts of the front propellers would be the same as those of the rear. It will also be readily apparent that the angle which the axis of the front propellers make with the vertical would be the same as that of the rear propellers and that for yaw, pitch or roll moment above, the magnitude of the blade angle change would be the same for all four propellers.

If the center of gravity is not midway between the front and rear propellers in hover position, the thrusts—and hence the blade angles—of the propellers nearer the center of gravity must be greater than those of the more remote propellers and the angle which the axes of the nearer propellers makes with the vertical must be less than that of the rear propeller axes. In this case, for yaw moment without any resulting roll moment and for roll moment without any resulting yaw moment, the blade angle changes for forward and rear propellers must differ in magnitude.

As mentioned above, in the particular aircraft used to illustrate the invention, the front propellers, in hovering, are nearer to the center of gravity of the craft and hence their blade angle setting for hover equilibrium is greater than that of the rear, and their axes are at the lesser angle to the vertical, e.g. 6° as compared with 10° for the rear.

Reference may now be made to FIGS. 8 and 9 which respectively show the confiuration of the aircraft more or less at the beginning and at the end of a transition between vertical or hovering flight, and horizontal flight. During transition the primary propeller thrust vectors 44 resolve into vertical lift components, and to horizontal components which result in forward travel of the aircraft. Control in transition about all three aircraft axes is secured in part by modifying the blade angles of the several propellers as explained in connection with FIGS. 5, 6 and 7. The airfoil control surfaces also come into play however, and aircraft lift is derived from the fixed airfoils 27 and 28. As the pods are tilted downwardly to accomplish transition, the airfoil control surfaces 29 and 31 are automatically raised. Also, as the pods are tilted downwardly the control surface motion per degree of pilot control motion increases. Control effectiveness is derived both from propeller blade angle changes and from the operation of control surfaces 29, 31 and 33. The ailerons 29 on the forward fixed airfoils operate in the same manner as ailerons on conventional aircraft, to produce rolling moments. The elevators are operated in unison to produce upward and downward pitching moments on the aircraft in the same manner as in conventional aircraft. The rudder 33 is moved to right or left to produce yawing moments for directional control. As the pods 34 are tilted forward, means are provided to gradually diminish the control moments due to blade angle changes of which the several propellers are capable, as will be pointed out. During transition, part of the aircraft lift is derived from the airfoils 27, 28, part from the vertical component of propeller thrust and part from the vertical component of propeller normal force 57.

In the FIG. 9 configuration, wherein the pods 34 tilted down so that their axes and consequently the propeller axes, are substantially parallel to the aircraft longitudinal axis, the aircraft flies substantially like a conventional aircraft and modulation of propeller blade angles for yaw, pitch and roll control is no longer necessary or desirable. Sufficient speed is attained, such that full roll control is afforded by the ailerons 29, full pitch control is afforded by the rearward elevators 31, and full yaw control is afforded by the rudder 33.

A significant portion of aircraft lift is obtained at times from propeller normal forces represented by vectors 57. Propeller normal forces 57 are created when the propeller axes of rotation are inclined at an acute angle to the relative wind. These normal forces may be made of appreciable magnitude by suitable design of the propeller blade plan form, blade angle distribution and other blade characteristics. The normal forces 57 make an important contribution to lift at moderate forward speeds when the lift provided by airfoils 27 and 28, which are relatively small in area, is inadequate. The magnitude of propeller normal forces 57 depend largely upon the angle of the pods and upon aircraft speed. The propeller normal forces make their greatest contribution to lift at pod tilt angles from 45° down to around 5° and become particularly useful as the vertical component of propeller thrust becomes small. As speed increases, as for example to 180 knots or better, the airfoils can provide adequate lift at efficient angles of attack, that is, at angles of attack at which the lift to drag ratio of the airfoils is fairly high. The use of airfoils of small area reduces drag and enables the aircraft to have a maximum forward speed.

A fuller exposition of the use of propeller normal force for aircraft lift will be found in the Patent 3,106,369 for "Aircraft and Method of Operating Same" of Henry V. Borst, issued October 8, 1963.

As noted above, in connection with the explanation of FIGS. 5–7, the control system is so arranged that in the hover configuration the blade angles of the several propellers can be changed to produce a moment about a single control axis, the moments about the other two axes remaining substantially unchanged. As the pods are tilted from the near-vertical to near-horizontal positions for transition from hover to level flight, the blade angle changes for desired pitch, roll and yaw effects will vary, and pitch, roll and yaw control will be transferred gradually from the propellers to the airplane control surfaces. As will be hereinafter shown, the control system, according to my invention, includes means for modulating, through the transition stage, the blade angle changes effected by a given movement of the pilot's control.

Certain maneuvers, such as climbing and turning, require developing simultaneously pitch, roll and yaw moments. Means hereinafter described are provided for combining the several control inputs to produce, in each of the four propellers, the change in blade angle requisite to the attainment of the combined pitch, roll and yaw effect. There are limits beyond which the blade angles cannot be set without impairing propeller operating efficiency or developing excessive stresses in transmission components, and the aforesaid modulating means confines the blade angles of the propellers within these limits. FIGS. 10, 11 and 12 show the general character of the modulations of blade angle changes for yaw, roll and pitch control in hover and throughout transition. The curves in all cases show the maximum and minimum blade angle changes resulting from maximum control inputs under different conditions, the numerical values being appropriate for the particular aircraft shown in FIGS. 1 to 4. The blade angle changes will, of course, be less than those shown for any particular tilt angle of the pods when control input movements are less than maximum. For any given tilt angle of the pods, blade angle changes vary linearly as control input movements are increased or decreased in magnitude.

FIG. 10 is illustrative of the blade angle changes for yaw control. As shown at the left of the plot, where the forward and rearward pods are at full hover position respectively at, for example, 96° and 80° to the horizontal, when the pilot applies full left rudder control, the blade angle of number 1 propeller (relating to the showing of FIG. 5) is increased by 1.9° while the blade angle of number 3 propeller is increased by 2.3°. Concurrently, the blade angle of number 4 propeller is decreased by 1.9°, and the blade angle of number 2 propeller is decreased by 2.3°. These blade angle changes in the hover position are such as to provide full left yaw moments on the aircraft without producing moments about the pitch axis or roll axis of the vehicle. As the aircraft transits from hover to forward flight the tilt angles of the forward and rearward propellers, that is, the angles made by the propeller axes with the longitudinal axis of the aircraft as measured in a clockwise direction, are gradually reduced by proportional angles shown horizontally at the bottom of the sheet. The maximum blade angle changes for full movement of the rudder control pedal decrease for the several propellers with decreasing tilt angle as shown in the curves. Yaw control availability by propeller pitch change is wholly eliminated or washed out as the forward pods are tilted to about 77° and the rearward pods are tilted to about 65°. From these tilt angles all the way down to zero, yaw control is accomplished by the rudder. The difference between the blade angle changes for propellers 1 and 4 and those for propellers 2 and 3 is necessary to prevent yaw control inputs from producing rolling moments on the aircraft.

Referring to FIG. 11, the curves therein show the blade angle changes for different tilt angles for maximum roll control inputs. The relationships defined by these curves are arrived at on the basis of two requirements, one of which is that blade angle changes must be such as to produce roll without yaw or pitch. The other is that control effect must be gradually transferred from the propellers to the ailerons. The ailerons are raised from "drooped" positions at a slow rate with respect to reduction in the tilt angle of the pods, and hence some control through the propellers must be provided all the way down to small tilt angles, at which point the ailerons alone can control the vehicle in roll.

The upper curves of FIG. 11 represents the blade angle increase of propeller 1 for roll to the right and the concurrent decrease in blade angle for propeller 4. With the positive blade angle change on propeller 1 a positive blade angle change is also made on propeller 2 in the hovering configuration, and concurrently, a negative blade angle change is made on propeller 3, as shown in the lower curves of FIG. 11. The blade angle change limits of propeller 1 remain in the same sense throughout the tilt angle range as do the blade angle change limits of propeller 4. The blade angle change limits of propellers 2 and 3 however, reverse in sense. As shown, the blade angle change for roll control on propeller 2, for roll to the right, starts at a positive value of 1.6° in the nearly vertical positions of the propeller axes but drops to zero at about 68° tilt angle, and then becomes negative. This occurs while the propeller 1 blade angle change limit remains positive throughout the tilting range of the pods. Concurrently, for roll to the right, the blade angle change for propeller 3 is reduced from a negative value of 1.6° to zero at approximately a 68° tilt angle, and thereafter becomes positive as the tilt angle changes between 68° and zero. The reversal of the direction or sense of the blade angle changes results from the established requirement for the system that roll control inputs by the pilot produce only roll moments on the aircraft without also creating moments about the yaw axis of the aircraft. This becomes clear when one considers the case where the forward pods are at about 83°. The changes in the horizontal components of propeller thrust resulting from an increase in blade angle of propeller 1 and an equal decrease in propeller 4, produce a yawing moment to the right, but the changes in propeller torque reaction with these blade angle changes produce an equal and opposite yawing moment, and hence the yaw moment produced by the blade angle changes in the front propellers is zero. Accordingly, the yaw moment produced by the rear propellers 2 and 3 must be zero, which, with the tilt angle of the rear propellers being at 68°, can be achieved only with both rear propellers at the same blade angle, i.e. zero change. At lower tilt angles, changes in blade angles of the front propellers for roll moment will produce a net yaw moment, which must be counteracted by suitable blade angle changes in the rear propellers. By reason of the differences in tilt angles, front and real, roll moment without yaw moment can be achieved by changing blade angles of the front propellers in the sense to produce roll in the desired direction and changing the rear blade angles in a lesser amount in the sense to produce roll in the opposite direction. The resulting yaw moment produced by the rear propellers will be equal and opposite to that produced by the front propellers, i.e. yaw moment is zero, but there will be a net rolling moment in the desired direction.

FIG. 12 relates to pitch control. The blade angle changes for pitch control do not produce moments about yaw or roll axes of the aircraft. Accordingly, the blade angle changes need only be scheduled to provide for the gradual elimination of blade angle control as tilt angle decreases and aircraft speed increases. As shown, all four propellers have their blade angle changes essentially the same for any given tilt angle between the nearly vertical positions of the propeller axes and their substantially horizontal positions. Because the elevators are raised slowly, they do not become effective for control until late in transition. Consequently substantial differential propeller thrust is relied upon for control in pitch throughout most of the transition. In FIG. 12 curve 1, 4 *up* represents the blade angle increase for propellers 1 and 4 for maximum pitch-up input. Correspondingly, curve 2, 3 *up* shows the decrease in blade angle for propellers 2 and 3 when the control input calls for pitch-up of the aircraft. In the same fashion, curve 1, 4 *down* shows the decrease in blade angle for the forward propellers for a pitch-down input call and curve 2, 3 *down* shows the increase in blade angle of propellers 2 and 3 for a pitch-down control call.

In all three sets of curves of FIGS. 10, 11 and 12 it will be seen that the pitch angle change for yaw, roll and pitch control washes out or becomes zero at or before zero tilt angle at which time the aerodynamic surface controls provide for full aircraft control.

The numerical values and precise curve shapes shown in the drawings and mentioned in this description are exemplary only for a particular aircraft design and configuration and are not to be considered generic to all such aircraft. However, the general form of the curves for propeller blade angle change are typical for the type of construction herein covered.

Reference may now be made to FIGS. 13, 13A and 13B, which show the physical arrangement of many of the control elements, and to FIG. 14 which relates the controls functionally. Referring more particularly to FIGS. 13, 13A and 13B, roll and pitch command by the pilot is afforded by management of the control yoke 60, respectively by turning the wheel 61 for roll control and by forward and rearward movement of the yoke 60 for pitch control. The wheel 61 connects to the ailerons 29 through cables 62, droop mechanisms 63, linkages such as 64, and torque shafts 66. A motion pick-off 68 along one of the cables 62, provides a roll control input to a control coordinator 67 through operating connections 68'. The yoke 60 connects to the elevators 31 through push-pull rods such as 69, cables 71, a droop mechanism 72 and torque tube 73. Droop mechanisms 63 and 72 are used to actuate and modify, in accordance with the angle of tilt of the pods, the control linkages to which they connect and any of the conventional types of droop mechanisms suitable for the purpose, may be employed. A motion pick-off 74 is provided along one of the cables 71, which provides a pitch input at 76 to the control coordinator 67.

Rudder pedals 78 are connected by rearwardly extending cables 79 to the rudder 33. Along one of these cables is a position pick-off 81 with connections 82 leading to a yaw control input element 83 at the control coordinator 67.

Droop mechanisms 63 and 72 are for the ailerons and elevators respectively. They function to provide lowered positions for these flight control surfaces during hovering flight, that is, when the propeller axes are nearly vertical, so that the surfaces do not interfere materially with the slipstreams of the propellers, and to raise the surfaces as the pods are tilted downwardly. The droop mechanisms minimize the force required of the pilot on his controls to effect movement of the flight control surfaces in hover by reducing the surface motion per degree of pilot's control motion as the flight control surfaces are lowered. The propeller pod tilting system comprises a reversible motor 86 which drives a series of torque shafts 87 (shown for convenience as flexible shafts) through a series of angle gear drive units 88. The principal shafts 87 lead to gear units 89 at the ends of the airfoils 27 and 28 which gear units tilt the pods 34 in response to operation of motor 86. This motor is operated selectively by the pilot in either direction and in large or small increments by manipulation of a control 86a (FIG. 14). Preferably this control is located on the control yoke 61. Shafts 87 lead to droop mechanisms 63 through linear actuators 63' and to droop mechanism 72 through subsidiary shaft 87'. The droop mechanisms modify the aileron and elevator control linkages as the pods are raised or lowered. As the pods approach horizontal positions, the ailerons and elevators are moved to the horizontal, whereby such control surfaces are available to provide full roll and pitch control of the aircraft when the airspeed of the aircraft is sufficient for this type of control.

The control coordinator 67 (see FIGS. 13–15) is provided with an input from one of the shafts 87 representing the angle of tilt of the pods. A manual control 92 provides a pitch trim input 91 to the coordinator. Further, the coordinator 67 is provided with inputs from automatic roll and pitch stabilizers 93 and 94 respectively. The stabilizers 93 and 94 are gyro stabilizers, a typical example of one of which is shown in FIG. 22. The aircraft includes the usual aircraft engine power and speed controls, and an engine speed governor 96, governed speed being regulated by a pilot control 96a (FIG. 14). The governor provides a control input 97 to the control coordinator 67. The central portion of FIG. 14, including those components within and between the dotted-line boxes, comprises the control coordinator. To the left of the coordinator are the pilot's controls, automatic controls and operative connections from these to the coordinator. The outputs 106, and blade angle changers 101, 102, 103 and 104 to which the outputs are applied to change the blade angles of propellers 1, 2, 3 and 4 respectively are shown at the right of the coordinator. The blade angle changers comprise parts of the propeller assemblies carried in the pods 34, each being connected with an output 106 from the control coordinator 67. In FIG. 13, the outputs 106 are noted as comprising push-pull rods 107 and levers 108 which connect the control coordinator 67 with the mechanisms of the propellers in the several pods 34.

Referring to FIGS. 14 and 15, the control coordinator comprises three control input mixers 111 for roll, 112 for pitch and 113 for yaw. These three input mixers are all connected to four control summers, 116 for propeller 1, 117 for propeller 2, 118 for propeller 3, and 119 for propeller 4. The three units 111–113 are similar in general but different in detail. The summers 116–119 are all essentially the same.

Roll control mixer 111 receives three inputs: an input at 68 resulting from a pilot's roll command, an input from the roll stabilizer 93 and an input at 87 according to the tilt angle of the pods. Such control mixer 111 issues a pitch change output signal for each propeller. The tilt angle input is inserted through cams 121 and 122 profiled to proportion blade angle changes to control inputs (manual and automatic), in accordance with FIG. 11, the cam 122 for the front propellers 1 and 4 being different from the cam 121 for the rear propellers 2 and 3.

Pitch control mixer 112 receives four inputs, that is, an input at 76 resulting from a pilot pitch command, an input from pitch stabilizer 94, an input at 91 from the manual trim control 92 and an input at 87 according to the angle of the pods. The control mixer 112 issues a pitch change output signal for the two forward propellers 1 and 4, and a pitch change output signal for the two rear propellers 2 and 3. The tilt angle input is inserted through cams 124 and 126. Cam 124 is profited to proportion blade angle changes to control inputs (manual and automatic), in accordance with the curves of FIG. 12. Cam 126 is profiled to effect blade angle changes in front and rear propellers required to maintain longitudinal balance, or trim, of the aircraft through transition from hover to horizontal flight. As has been noted above, for proper longitudinal balance in hover, the blade angle of the front propellers is 2°–3° greater than that of the rear propellers. However, as the tilt angle is decreased only slightly from the vertical and the aircraft gains moderate forward speed a considerable pitch-up moment is produced which must be counteracted by a substantial decrease in blade angle of the front propellers and equal increase in that of the rear propellers. At the maximum—which occurs at tilt angles in the vicinity of 70°—the blade angle of the rear propellers is appreciably—as much as 5°—larger than that of the front propellers. As the tilt angle is further reduced, the blade angle difference is gradually reduced, the blade angle of all four propellers being substantially the same, from tilt angle of about 20° down to zero tilt.

Yaw control mixer 113 combines two inputs; one input at 83 resulting from a pilot's yaw command and one input at 87 according to the angle of the pods. A cam 128, operable according to the tilt angle of the pods, is provided to proportion the blade angle changes of propellers 1 and 4 to control inputs, in accordance with the upper curves of FIG. 10. A cam 129 proportions the blade angle changes of propellers 2 and 3 to control inputs, in accordance with the lower curves of FIG. 10.

The cams 121, 122, 124, 128 and 129 are parts of a plurality of proportioner or gain changer mechanism of essentially the same configuration. These mechanisms all bear the number 131. The mechanisms, along with control input linkages associated with them for roll, pitch and yaw are shown more clearly in FIG. 16. The geometry of the gain changers in FIG. 16 is distorted to facilitate an understanding of the general system; the actual geometry of a gain changer of the type used is shown in FIGS. 17-20.

Figure 17:
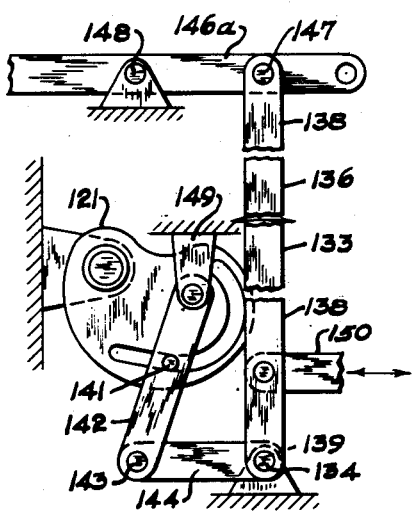

The gain changer of FIGS. 17-20 is a novel mechanical computing device, more particularly a multiplier. As to the construction of such device, a link 133 is pivoted to fixed support pivot 134. A link 136 is pivoted at the upper end of link 133 at 137, and an output link 138 is pivoted to the lower end of 136 at 139. Links 133, 136 and 138 are of the same length. In FIG. 17, these links are shown overlying one another, the upper and lower pivots of the several links being coaxial. The locus of pivot 139 is controlled by the cam such as 121, through cam follower 141 on a swing link 142, having a lower pivot 143. The pivots 139 and 143 are joined by a link 144. Link 133 is coupled by a link 150 to a control input, in this case a "mixed" manual and automatic roll control. Through this link, the angular position of link 133 is established. The locus of pivot 143 is established by the position of cam followers 141. Pivot 139 is swing-able around the pivot 143. The output link 138 joins pivot 139 with an output rocker lever 146a at a pivot 147, the rocker lever itself having a fixed pivot 148. The length of link 144 is equal to the distance between pivots 148 and 147.

When, in response to propeller axis tilt, the cam 121 is rotated to the position shown in FIG. 17, pivot 139 is positioned coaxial with pivot 134. In this position, links 133 and 136 swing in unison in response to control inputs through link 150, pivot 139 remains stationary and lever 146 is not moved. This is the "zero gain" position, i.e. the position in which control movement produces no blade angle change. In the example used, it is the position when the tilt angles are 83° front and 68° rear. By reference to FIG. 11 it will be noted that at this tilt angle, a roll control input should produce no change in blade angle for propellers 2 and 3, which are the propellers affected by cam 121. It will be noted that cam 121 is so designed that at the extreme corresponding to zero tilt, the pivot 139 is again the zero gain position.

Figure 18:
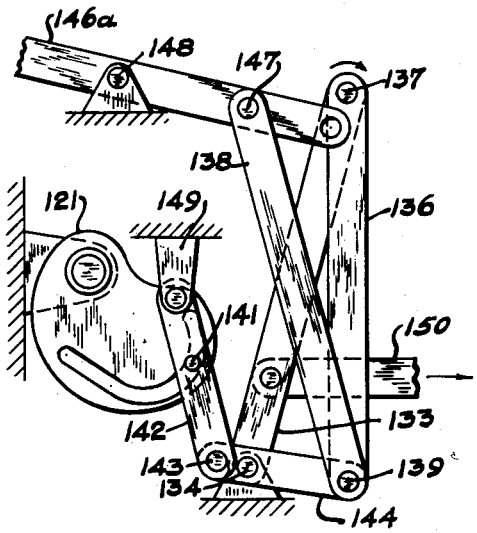

In FIG. 18, cam 121 is shown rotated to swing link 142 to the right, thus moving pivot 139 to the right of fixed pivot 134. Now, *rightward* swing of link 133 enforces *clockwise* movement of output lever 146a, and leftward swing, counterclockwise movement. This position corresponds to tilt angles of 48° front and 40° rear, at which point (as indicated in FIG. 11) a right roll control input produces a *decrease* in blade angle of propeller 2 and an *increase* in that of propeller 3. In FIGS. 19 and 20, cam 121 has been rotated to swing link 142 to the left, thus moving pivot 139 to the left of fixed pivot 134. Now, *rightward* swing of link 133 enforces *counterclockwise* movement of output lever 146a, and leftward swing, clockwise movement. This is the position when the propellers are in hover configuration, at which point a right roll control input produces an *increase* in blade angle of propeller 2 and a *decrease* in that of propeller 3.

As applied in FIGS. 14 and 16 the several gain changers or proportioners are, according to the angle of tilt of the pods, controlled through the cams 121, 122, 124, 128 and 129 which are shaped to provide gain change to conform to the requirements as noted in FIGS. 10, 11 and 12 for yaw, roll and pitch control. The gain changer for the rear propellers for roll control transit from plus gain through zero to minus gain and to zero again as pods tilt downwardly. The others all modify gain between zero at low tilt angles of the pods to a maximum in one direction at high tilt angles.

In control mixer subassembly 111 of FIG. 16, the roll command input at 68' and the roll stabilizer input at 93' are linked together by differential linkage 149 to operate one of the gain changer input links 133 through a link 151. The links 133 of two gain changers are tied together for joint movement by link 150. The lever 146a provides blade angle change signals to propellers 3 and 2, and lever 146b provides blade angle change signals to propellers 4 and 1, all for roll control.

In mixer subassembly 113 of FIG. 16, the pitch command input at 76 and pitch stabilizer input at 94' are linked together by differential linkage 152 to operate the associated input link 133 of the gain changer. The output lever 146c thereof comprises part of another differential linkage including a lever 153. This lever combines the input signal at 91 from the manual trim adjustment and from the tilt angle responsive pitch trim cam 126 working through a cam follower 154. Output lever 146c is linked to a rocker 156, one end of which controls blade angle signals to aft propellers 3 and 2, and the other end of which controls blade angle signals to forward propellers 1 and 4, all for control about the pitch axis of the aircraft.

In mixer subassembly 112 of FIG. 16 the yaw command input at 83 is linked to one input link 133 of a gain changer 131, said link being connected to a link 133' of another gain changer 131 through a motion reversing link 158. The right hand gain changer 131 serves propellers 1 and 4, and its leftward counterpart serves propellers 2 and 3, both with respect to aircraft yaw. The motion reversing link 158 between yaw gain changers is used to secure the proper directions of propeller blade angle change for yaw control thrust increments and decrements as delineated in connection with FIG. 5.

As shown in FIGS. 14 and 15, the several roll, yaw and pitch control mixer subassemblies 111, 112 and 113 connect with the several control summing subassemblies 116, 117, 118 and 119, whereby outputs of the mixers are inputs to the summing subassemblies. As mentioned above, the engine speed governor is also connected to each summing subassembly to effect collective blade angle changes. Accordingly, each summing subassembly has four inputs, and a single combined blade angle signal output which is conveyed to the appropriate propeller. The summing subassemblies are shown diagrammatically in FIG. 14, but one of them is shown more clearly in FIG. 21. Referring to FIG. 21, bellcranks 161 and 161' are pivoted on a fixed shaft 162, the shaft also freely supporting links 163, 164 and 165. To the vertical limb of crank 161 there is pinned an input rod 166 leading from one of the control mixers such as the yaw mixer. A shaft 267, mounted in the right ends of the horizontal limbs of bellcranks 161 and 161' pivotally supports a bellcrank 167 and link 167'. Shaft 267 also pivotally mounts links 169 and 171, respectively equal in effective length to links 164 and 165. The vertical limb of crank 167 is pivoted to a bar 172 at 173, this bar in turn being pivoted on the lower end of link 163 at 174. To pivot 174, an input rod 176 is attached, this leading from another of the control mixers such as the roll mixer.

A shaft 278 mounted in the right end of the horizontal limb of bellcrank 167 and in the right end of link 167' pivotally supports link 178 and bellcrank 178'. Shaft 278 also pivotally mounts a link 181, equal in length to links 169 and 164. The vertical limb of bellcrank 178' is pivoted at 182 to a bar 183 pivoted at 184 to link 171. In turn, a bar 185 joins pivots 184 and 186, and an input rod 187 from pivot 186 connects to another of the control mixers, such as the pitch mixer. A shaft 279 is mounted in the right end of the link 178 and in the right end of horizontal limb of crank 178'. Shaft 279 pivotally supports bellcrank 189. The vertical limb of crank 189 has a pivot 192, to which a rod 193 is attached, rod 193 being pivoted at 194 to link 181. In turn, rods 196 and 197 are pivoted to the ends of links 181, 169 and 164, and a control input rod 198 leads from link 164 at a pivot 199 to the fourth control device, such as the collective blade angle control from the speed governor 96. The several sets of crank limbs, links and bars in FIG. 21 all are of parallelogram configuration, so that all upright crank limbs and links of the same set remain parallel regardless of the tilt of the sets of lateral links and crank limbs, which, too, remain parallel to one another. Any one input movement will tilt its corresponding bellcrank, raising or lowering its right end and correspondingly raising or lowering the bellcranks mounted on the shaft carried by its right end. Consequently, the right end 201 of bellcrank 189 will take a vertical position, relative to shaft 162, which is the algebraic sum of the positions of the other bellcrank ends. If any three inputs remain fixed, the fourth input will move the end 201 accordingly, regardless of which one it may be. The parallelogram transfer linkages assure independence of action of each control input, without inter-modulation with others.

These summing units of FIG. 21, then, combine the several autonomous inputs and produce a single blade angle control signal for each corresponding propeller. Conversion of the vertical output motion of end 201 to lateral motion may be attained by another bellcrank 202 on a fixed pivot 203, the output rod 106 being pivoted to such bellcrank.

FIG. 22 shows, in partial section, an exemplary gyro stabilizing unit such as the units 93 or 94 previously mentioned. One of these is oriented for response to aircraft pitching excursions or perturbations, and the other, to aircraft roll excursions or perturbations. Each unit comprises a gyro wheel 211 whose axle 212 is mounted in bearings 213 in a gimbal ring 214. The wheel 211 is driven by a slender shaft 216 coupled to the wheel, passing through the axle 212, and driven by an external power source. The gimbal ring 214 is carried in bearings 217 on pedestals 218 fixed to the base 219 of the instrument. An arm 221 forms part of the gimbal ring. As shown in the drawing, the axis 222 in the plane of the paper, normal to the gyro spin axis and to the gimbal axis established by bearings 217, is the axis about which the instrument is sensitive to excursions or disturbances. With the gyro wheel spinning, rotation of the instrument in one direction or the other about the axis 222, causes the end of the arm 221 to exert a force upwardly or downwardly from the steady-state position in which it is shown.

To the end of the arm 221, a slender push-pull rod 223 is secured, this rod at its lower end being rigidly attached to a fitting 224 carrying a valve stem 226 which enters a valve bore 227 in a housing 228 secured to the base 219. The valve stem is urged to a centered position by stiff springs 229 and 231 which resist deflections of arm 221, allowing valve stem movement of only a small fraction of an inch for the greatest gyroscopic forces which may be applied to the stem. The flexibility of rod 223, except in an axial direction, permits relative lateral movement between arm-end 221 and valve stem 226, with no lost motion or slack in the push-pull direction. Valve 226 cooperates with ports in the wall of the bore 227 to valve pressurized fluid delivered at ports 232 and 233, to one or the other of passages 229' or 231'; spent fluid passes from port 250. Passages 229' and 231' enter into the top and bottom respectively of a cylindrical chamber 236 containing an actuating piston 237 from which a rod 238 extends, the latter being the power output element by which the gyro response is conveyed to the aircraft control coordinator already described. Springs 239 and 239' are contained in the chamber 236 to center the piston when the system is relaxed. A feedback connection which extends from the rod 238 includes lever 241 secured to a pivot 242 on the housing 228. This lever is pinned at one end to the rod 238, and at its other end to a rod 243 carrying a spring seat 244. A low-rate spring 246 acts between the seat and valve stem bracket 224, this spring being opposed by another low rate spring 247 acting between the bracket 224 and an adjustable spring seat 248 secured to the base 219.

Springs 246 and 247 combine with the stiffer springs 229 and 231 to resist displacement of valve 226 from its centered position. When, as a result of a pitch or roll disturbance, a force is exerted upon the valve by the arm 221, the valve is moved until the resulting change in compression of the four springs 229, 231, 246 and 247 produces a net force in the spring system equal and opposite to the gyroscopic force.

As noted above, this displacement of the valve results in feeding pressure fluid to the appropriate side of the piston 237 and rod 238 and rod 238 is moved in the direction to transmit to the control coordinator a signal calling for a control effect tending to restore the aircraft to equilibrium attitude.

The movement of rod 238, by reason of its movement of spring seat 244, changes the load in spring 246 in a sense such that the net force of the spring system opposing the gyro force is increased and hence the valve is moved toward the closed position. Concurrently the restoring control effect is reducing the rate of pitch or roll, and hence the gyro force. The combination of these effects results in stopping movement of the rod 238 at a point where the net force of the spring system with the valve in closed position is exactly equal and opposite to the gyro force. Further decrease in the rate of pitch or roll then results in movement of the valve in the direction to admit the pressure fluid to the opposite side of the piston, moving the piston back toward its center position. With the benefit of the "negative feed back" afforded by the lever 241, the stabilizer is designed so that the pitch or roll rate is reduced to zero at substantially the same time that the piston and the valve reach their respective center positions.

As the aircraft is tilted—in either pitch or roll—from its level attitude, a horizontal component of propeller thrust is applied to the craft, gradually imparting to the craft a horizontal velocity in the direction of the tilt, i.e. if the craft rolls to the right it will gradually acquire lateral velocity to the right. The relative wind then approaches the propeller from the side, creating a moment tending to restore the aircraft to a level attitude. As the aircraft moves toward this level attitude, the gyro stabilizer acts to oppose this motion in the same manner as it acted to oppose the disturbance motion. Again the action of the negative feedback acts to bring the craft back to level attitude with little or no oscillation. The overall action of the gyro stabilizers has the effect of damping roll, or pitch, disturbances in the aircraft, and preventing any tendencies for uncontrolled and divergent instability about the roll and pitch aircraft axes. VTOL aircraft of the type disclosed herein have very low inherent damping, varying between drastic underdamping where disturbances may increase in a divergent oscillatory manner, toward a damping condition where disturbances continue in a protracted oscillatory manner. The gyro stabilizer unit described augments the natural low damping of the VTOL aircraft in hover and transition, causing it to behave in the manner of an inherently dynamically stable vehicle. An ordinary rate gyro can only limit divergence of oscillatory disturbances, but does not cause them to converge and damp out. The gyro stabilizing unit described controls the aircraft to damp out oscillatory disturbances and thus, in a manner of speaking, synthetically endows the vehicle with the qualities of a self-damping stable craft. While the aircraft can be flown without the stability augmentors or gyro instruments of FIG. 22, the latter relieve the pilot of constant policing of stability and thus help greatly in reducing pilot fatigue when the aircraft is in hover and transition flight modes. In horizontal normal flight, the control augmentation of the gyro instruments is not required as the vehicle assumes the stability qualities of the conventional highly stable aircraft.

It will be clear to those skilled in the art that various changes and modifications may be made in the structure shown and described without departing from the spirit and scope of the invention as set out in the appended claims.

I claim:

1. In a vertical take-off aircraft; two forwardly disposed laterally spaced thrust producing devices having substantially parallel axes defining lines of resultant thrust, said axes making an acute finite angle with the vertical; two rearwardly disposed laterally spaced thrust producing devices having substantially parallel axes defining lines of resultant thrust, the axes of the rearwardly disposed thrust producing devices making an acute finite angle with the vertical but on the opposite side of the vertical from said first mentioned acute angle and of different magnitude than the first mentioned acute angle; and means to increase thrusts of two diagonally opposed thrust producing devices while decreasing thrusts of the other two diagonally opposed thrust producing devices to produce yaw moments for control of the aircraft, said means including mechanism for proportioning thrust changes to prevent the creation of roll moments on the aircraft.

2. In a vertical take-off aircraft; two forwardly disposed laterally spaced thrust producing devices having substantially parallel axes defining lines of resultant thrust, said axes making an acute finite angle with the vertical; two rearwardly disposed laterally spaced thrust producing devices having substantially parallel axes defining lines of resultant thrust, the axes of the rearwardly disposed thrust producing devices making an acute finite angle with the vertical but on the opposite side of the vertical from said first mentioned acute angle and of different magnitude than the first mentioned acute angle; means for changing thrusts of two thrust producing devices on one side of the aircraft while also changing the thrusts of the other two thrust producing devices on the other side of the aircraft to produce a rolling moment for control of the aircraft, said means including mechanism for proportioning said thrust changes to prevent the creation of yaw moments on the aircraft.

3. Aircraft for vertical and horizontal flight comprising quadrilaterally disposed variable blade angle propellers, jointly selectively tiltable between positions in which the axes of rotation of the propellers are in predetermined nearly vertical positions and positions in which the axes of rotation of the propellers are in substantially horizontal positions, means driving said propellers in unison, power means for tilting said propellers to desired tilt angles, fixed airfoil means including control surfaces in the slipstreams of said propellers, normally operable for control of the aircraft in horizontal flight, and mechanism connected with said control surfaces and operable by said power means for moving the control surfaces, during tilting of the propellers toward the said nearly vertical positions of the propeller axes, to positions whereat they present minimum surface area to the slipstreams of the propellers.

4. In a VTOL aircraft having quadrilaterally disposed thrust producers including two laterally spaced forward thrust producers and two laterally spaced rearward thrust producers with the axes of said thrust producers being tiltable between nearly vertical positions and substantially horizontal positions, the combination comprising means to differentially vary thrusts of the thrust producers, means for tilting the thrust producers between nearly vertical positions and nearly horizontal positions to effect a transition between vertical or hovering flight and level flight, lifting airfoils on the aircraft, elevators and ailerons hinged on the airfoils, a rudder on the aircraft, pilot's aircraft controls operatively connected to the elevators and ailerons and rudder; a control system providing pitch, roll and yaw control signals during vertical flight, hovering, and transition from vertical flight or hovering to level flight; operative connections between said control system and the thrust changing means for applying said signals to the thrust changing means, and operative linkage connecting said control system to said pilot's aircraft controls and to said means for tilting the thrust producers; said linkage applying to said control system input signals proportional respectively to movement of the pilot's aircraft controls and tilting movement of the thrust producers.

5. The combination as defined in claim 4 wherein the thrust producers are variable blade angle propellers, and the thrust changing means are propeller blade angle changers.

6. In a VTOL aircraft, a plurality of tiltable thrust producers, means to differentially vary thrusts of the thrust producers, means for tilting the thrust producers between nearly vertical positions and nearly horizontal positions to effect a transition between vertical or hovering flight and level flight, lifting airfoils on the aircraft, elevators and ailerons hinged on the airfoils, a rudder on the aircraft, pilot's aircraft controls operatively connected to the elevators, ailerons and rudder, a control system providing pitch, roll and yaw control signals during vertical flight, hovering, and transition from hovering or vertical flight to level flight, operative connections between said control system and the thrust changing means for applying said signals to the thrust changing means, automatic pitch and roll stabilizing means producing signals in response to pitch and roll disturbances, a pilot's longitudinal trim control, and operative linkages connecting said control system to said pilot's aircraft and trim controls, said automatic stabilizing means, and said means for tilting the thrust producers; said operative linkages applying to said control system input signals proportional respectively to movement of the pilot's aircraft and trim controls, pitch and roll disturbances, and tilting movement of the thrust producers.

7. The combination as defined in claim 6 wherein the control system includes means to combine the input signals thereto and produce an output signal representative of the change in thrust of each thrust producer required to produce the effect dictated by the combined input signals.

8. In a VTOL aircraft, quadrilaterally disposed variable blade angle propellers including two propellers forwardly disposed and two rearwardly disposed, the axes of said propellers being selectively tiltable between predetermined nearly vertical positions and substantially horizontal positions, means to selectively change the blade angles of forward propellers in one direction and concurrently to change the blade angle of rearward propellers in the other direction for aircraft pitch control, means responsive to the tilt of said propeller axes to modify the blade angle changes effected by the first mentioned means, an automatic gyro stabilizer operable according to pitching velocity of the aircraft, and means operated by said gyro stabilizer to further modify the blade angles of said propellers to restore pitch attitude of said aircraft after excursions from a pilot selected attitude.

9. In a VTOL aircraft, quadrilaterally disposed variable blade angle propellers including two laterally spaced forward propellers and two laterally spaced rearward propellers, the axes of said propellers being selectively tiltable between predetermined nearly vertical positions and substantially horizontal positions, means to change selectively the blade angles of propellers on one side of the aircraft relative to the blade angles of propellers on the other side for aircraft roll control, means responsive to the tilt of said propeller axes to modify the blade angle changes effected by the first mentioned means, an automatic gyro stabilizer operable according to rate of roll of said aircraft, and means operated by said gyro stabilizer further to modify the blade angles of said propellers to restore roll attitude of said aircraft after excursions therefrom.

10. In a VTOL aircraft having four quadrilaterally disposed variable blade angle propellers including two forward propellers on opposite sides of the aircraft and two rearward propellers on opposite sides of the aircraft, means for tilting the propeller axes of rotation between predetermined nearly vertical positions and substantially horizontal positions, a pilot's control for initiating yaw of the aircraft, a pilot's control for initiating roll of the aircraft, means for increasing the blade angles of one pair of diagonally opposite propellers in unequal amounts while decreasing the blade angles of the other pair of diagonally opposite propellers in unequal amounts in response to movement of the said pilot's control for initiating yaw, the said means including mechanism responsive to tilt of the propeller axes for proportioning the blade angle changes among the propellers to minimize the creation of roll moments when said pilot's control for initiating yaw is operated in various tilted positions of the propeller axes and to gradually reduce yaw control moments producible by the propellers as the propeller axes are tilted toward the horizontal, other means for increasing the blade angles of the one pair of propellers on one side of the aircraft in unequal amounts while decreasing the blade angles of the pair of propellers on the other side of the aircraft in unequal amounts in response to movement of the pilot's control for initiating roll, the said other means including mechanism responsive to tilt of the propeller axes for proportioning blade angle changes among the propellers to minimize the creation of yaw moments when said pilot's control for initiating roll is operated in various tilted positions of the propeller axes and to gradually reduce roll control moments producible by the propellers as the propeller axes are tilted toward the horizontal.

11. A VTOL aircraft as defined in claim 10 wherein each of the said mechanisms includes a plurality of cams which are positioned according to the tilt of the propeller axes and which operatively connect with the said propellers of the aircraft.

12. In a VTOL aircraft having four quadrilaterally disposed variable blade angle propellers including two forward propellers on opposite sides of the aircraft and two rearward propellers on opposite sides of the aircraft, means for tilting the propeller axes of rotation between predetermined nearly vertical positions and substantially horizontal positions, a pilot's control for initiating yaw of the aircraft, means for increasing the blade angles of one pair of diagonally opposite propellers in unequal amounts while decreasing the blade angles of the other pair of diagonally opposite propellers in unequal amounts in response to movement of said pilot's control, the said means including mechanism responsive to tilt of the propeller axes for proportioning the blade angle changes among the propellers to minimize the creation of roll moments when said pilot's control is operated to yaw the aircraft in various tilted positions of the propeller axes and to gradually reduce yaw control moments producible by the propellers as the propeller axes are tilted toward the horizontal.

13. A VTOL aircraft as defined in claim 12 wherein said mechanism includes a pair of cams which are positioned according to the tilt of the propeller axes, one of said cams being operatively connected to the forward propellers and the other cam being operatively connected to the rearward propellers.

14. In a VTOL aircraft having four quadrilaterally disposed variable blade angle propellers including two forward propellers on opposite sides of the aircraft and two rearward propellers on opposite sides of the aircraft, means for tilting the propeller axes of rotation between nearly vertical positions and substantially horizontal positions, a pilot's control for initiating roll of the aircraft, means for increasing the blade angles of the pair of propellers on one side of the aircraft in unequal amounts while decreasing the blade angles of the propellers on the other side of the aircraft in unequal amounts in response to movement of said pilot's control, the said means including mechanism responsive to tilt of the propeller axes for proportioning the blade angle changes among the propellers to minimize the creation of yaw moments when said pilot's control is operated to roll the aircraft in various tilted positions of the propeller axes and to gradually reduce roll control moments producible by the propellers as the propeller axes are tilted toward the horizontal.

15. A VTOL aircraft as defined in claim 14 wherein said mechanism includes a pair of cams which are positioned according to the tilt of the propeller axes, one of said cams being operatively connected to the forward propellers and the other of said cams being operatively connected to the rearward propellers.

References Cited by the Examiner

UNITED STATES PATENTS

| 1,287,076 | 12/18 | Moses | 244—12 |
| 1,573,563 | 2/26 | Moore | 244—51 X |
| 1,846,992 | 2/32 | Decker | 244—7.3 |
| 2,284,902 | 6/42 | Hosford | 244—66 X |
| 2,427,939 | 9/47 | Woods | 244—79 X |
| 2,478,847 | 8/49 | Stuart | 244—7 |
| 2,702,168 | 2/55 | Platt | 244—7 |
| 2,936,968 | 5/60 | Mazzitelli | 244—7 |
| 2,943,822 | 7/60 | Hamilton | 244—52 X |
| 3,029,043 | 4/62 | Churchill | 244—7.3 |
| 3,037,721 | 6/62 | Stefanutti | 244—7 |
| 3,081,964 | 3/63 | Quenzler | 244—7 |

FOREIGN PATENTS

| 209,137 | 1/24 | Great Britain. |
| 666,491 | 2/52 | Great Britain. |
| 506,664 | 5/54 | Belgium. |
| 1,023,327 | 1/58 | Germany. |

OTHER REFERENCES

Aviation Week, Jan. 26, 1959, pages 56, 57, 61, and 65.

Proceedings of the 15th Annual National Forum of American Helicopter Society, May 7–9, 1959, pages 103–112.

Proceedings of the Fourteenth Annual Forum of The American Helicopter Society, pages 32, 37 (April 1958).

FERGUS S. MIDDLETON, *Primary Examiner.*

EMILE PAUL, MILTON BUCHLER, *Examiners.*